Dec. 5, 1950     C. C. SHERER ET AL     2,532,954
HYDROSTATIC PRESSURE TESTING APPARATUS
Filed May 11, 1945     4 Sheets-Sheet 1
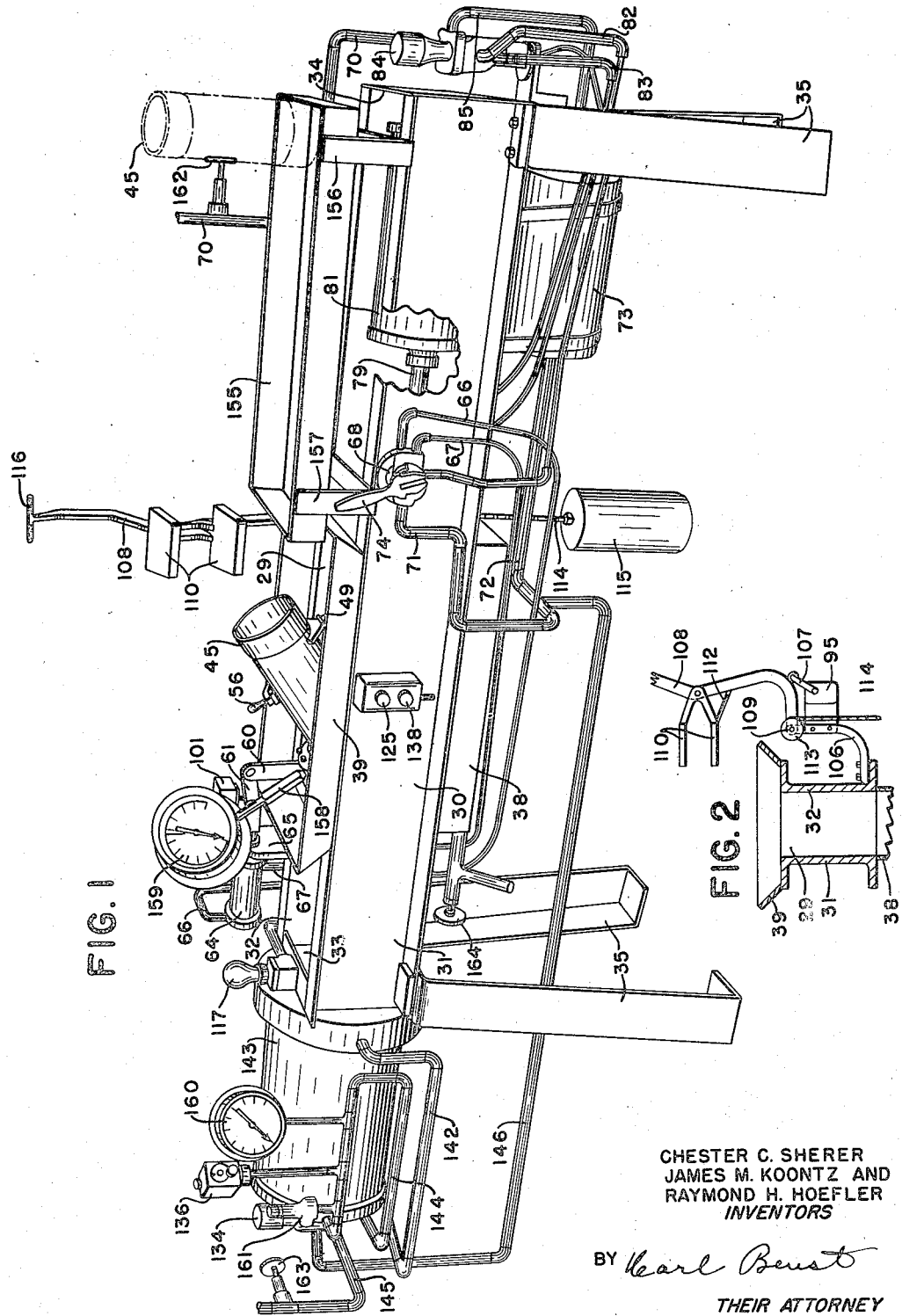
CHESTER C. SHERER
JAMES M. KOONTZ AND
RAYMOND H. HOEFLER
INVENTORS
BY Karl Beust
THEIR ATTORNEY

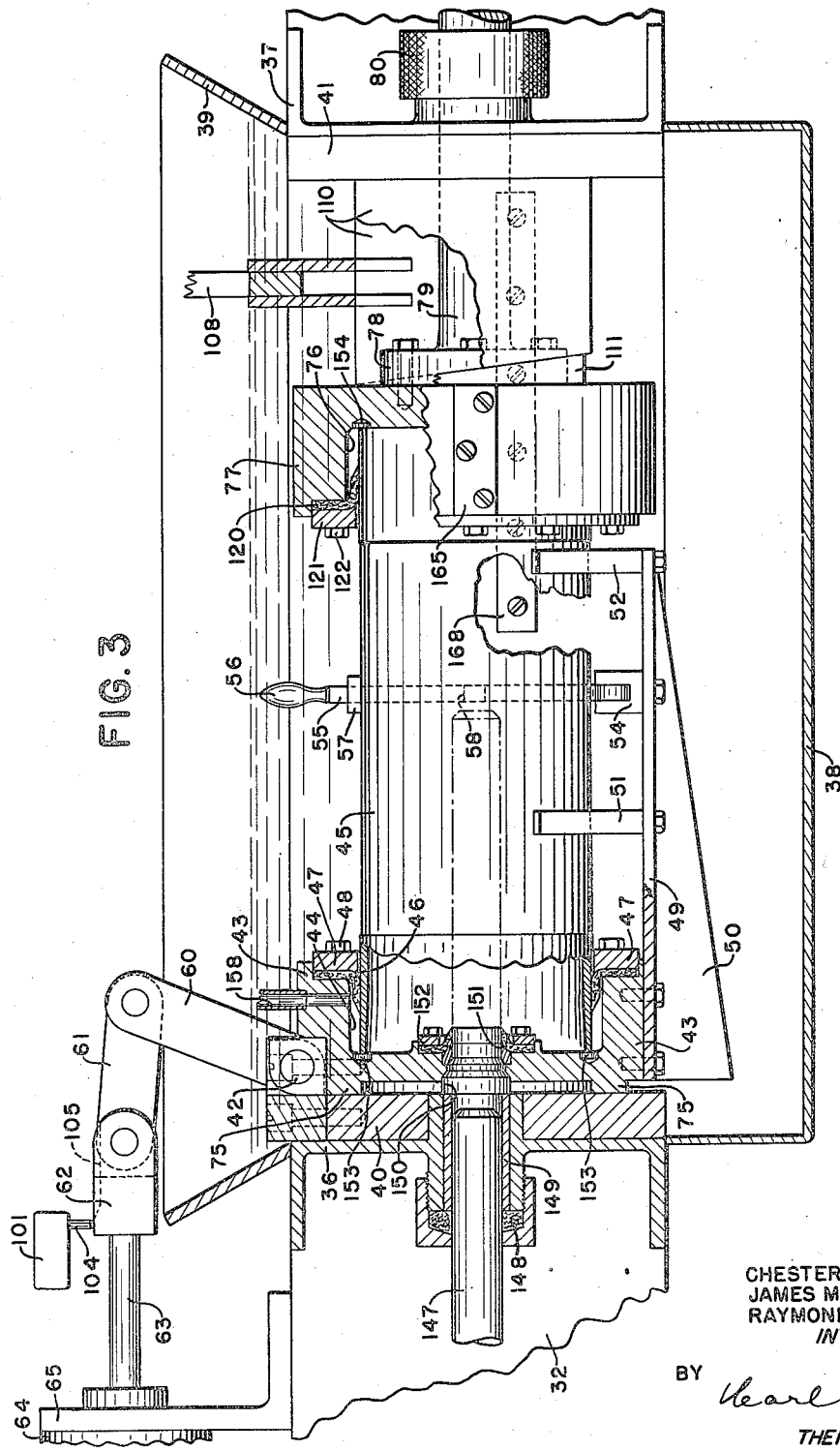

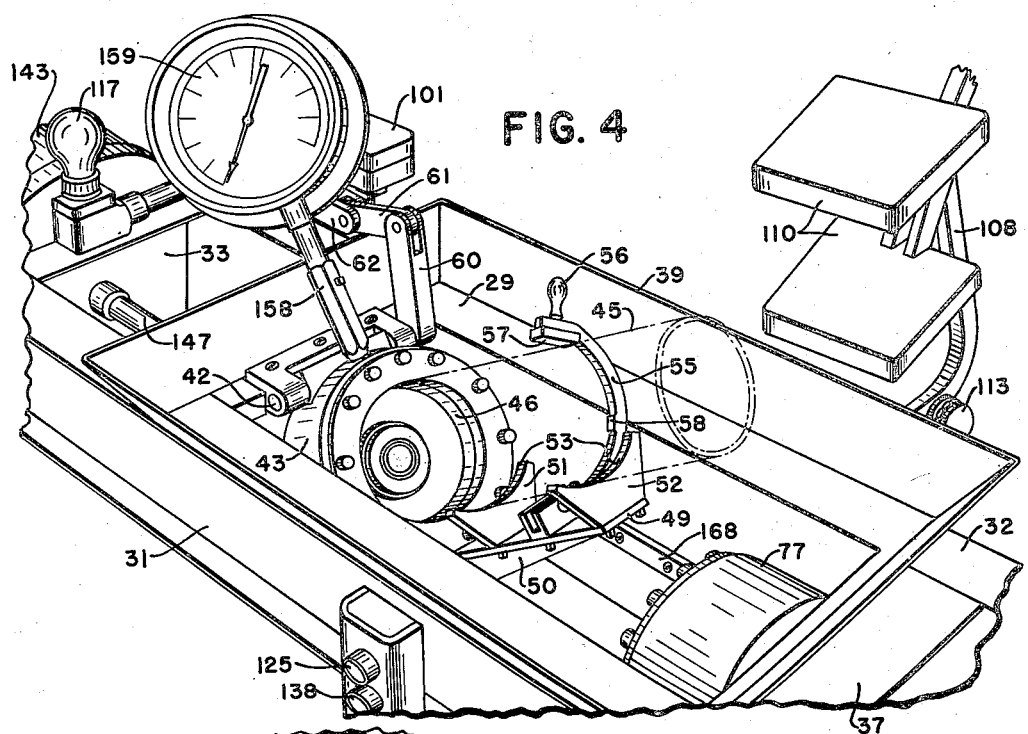
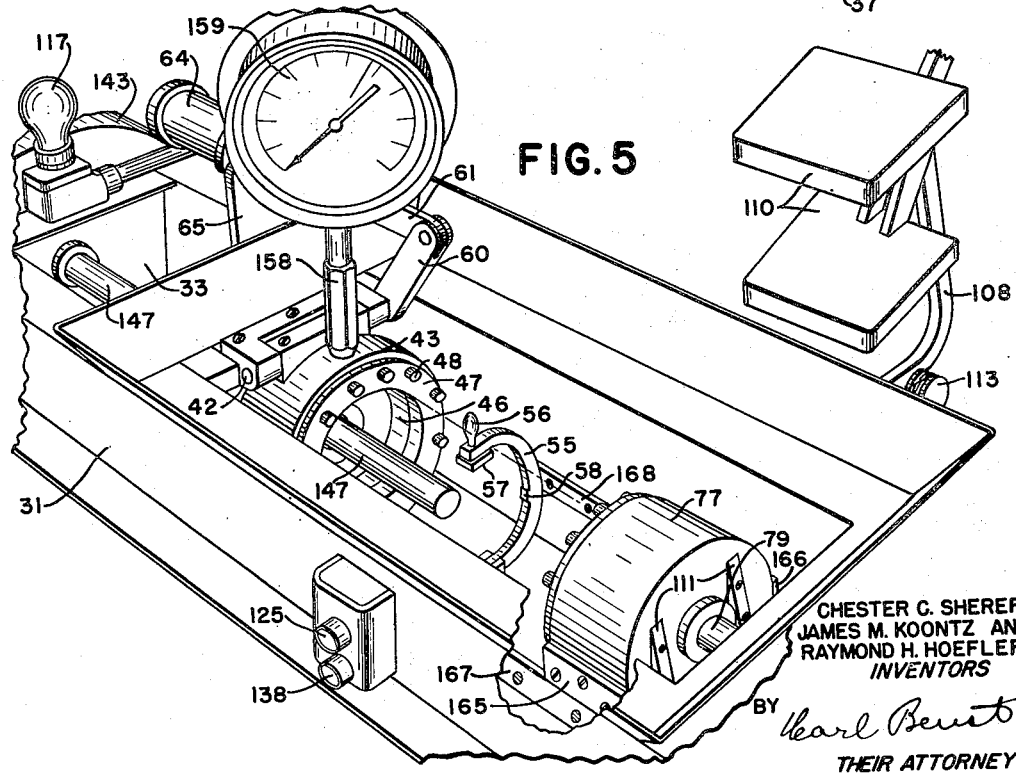

CHESTER C. SHERER
JAMES M. KOONTZ AND
RAYMOND H. HOEFLER
*INVENTORS*

BY Karl Beust

*THEIR ATTORNEY*

Patented Dec. 5, 1950

2,532,954

UNITED STATES PATENT OFFICE 2,532,954

HYDROSTATIC PRESSURE TESTING APPARATUS

Chester C. Sherer, James M. Koontz, and Raymond H. Hoefler, Dayton, Ohio, assignors to The National Cash Register Company, Dayton, Ohio, a corporation of Maryland Application May 11, 1945, Serial No. 593,170

13 Claims. (Cl. 73—37)

The present invention relates to apparatus for pressure-testing the side wall structure of hollow articles.

One object of the present invention is the provision of an apparatus for testing the strength of the side walls of hollow articles.

Another object is to provide hydrostatic means for pressure-testing the strength of the side wall structure of hollow cylindrical articles open at both ends.

A further object is to provide a method for testing the strength of the side wall structure of hollow articles by filling the articles to be tested with an incompressible liquid, sealing the articles against leakage, and then applying pressure to the liquid in the articles so as to simultaneously apply equal pressure to the entire side wall structure thereof.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a perspective view of the complete testing machine.

Fig. 2 is a detail view, partially sectioned, showing the manually operable wedge mechanism and a control switch operated thereby.

Fig. 3 is an enlarged sectional view of the central or reservoir portion of the testing machine, showing in particular the manner of sealing the cylindrical articles to be tested against leakage.

Fig. 4 is a fragmentary perspective view of the central portion of the machine, showing in particular the article-submerging mechanism in elevated position.

Fig. 5 is a perspective view of the central portion of the machine, similar to Fig. 4, showing in particular the article-submerging mechanism in submerging position.

Description

Figure 6:
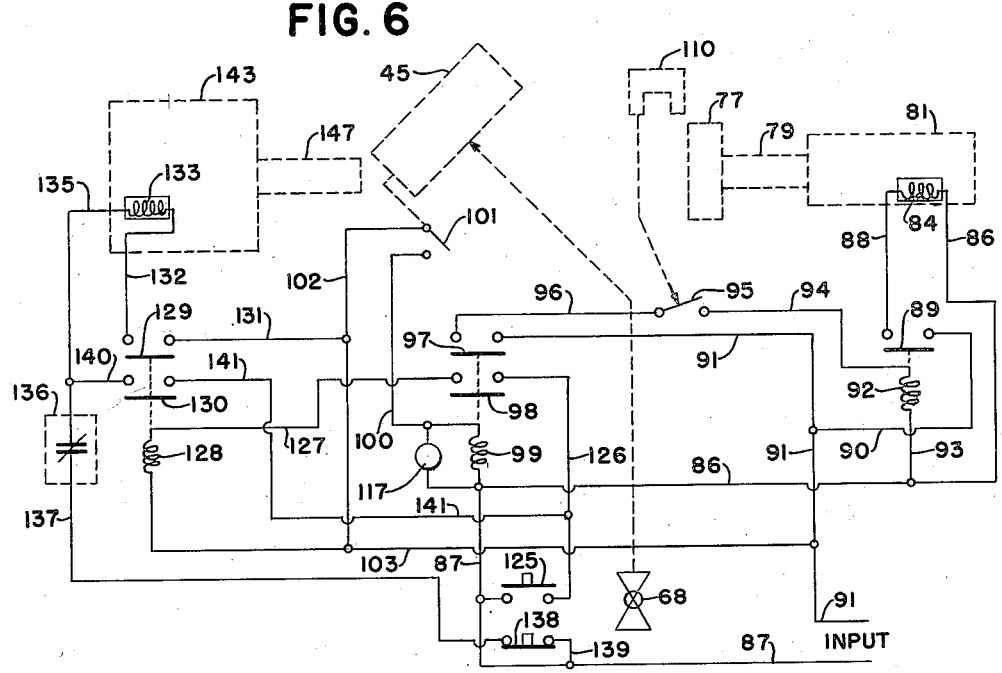
Fig. 6 is a wiring diagram of the electrical portion of the testing machine, including the hand- and relay-operated switches and the solenoid-actuated valves controlled thereby.

The present invention is directed to an apparatus or machine for testing the strength of the side wall structure of hollow articles, said articles in this particular case being cylindrical or tubular in shape and open at both ends.

As presently constructed, the testing machine of the present invention has a closure or cap for closing and sealing each end of the cylindrical articles to be tested. The head cap is rockable from an elevated or article-receiving and -removing position to operating position and vice versa, in which former position one end of the article to be tested may be conveniently inserted therein.

With the head cap portion of the machine in article-receiving position, the operator inserts one end of one of the cylindrical articles therein, said head cap portion being provided with guide means for guiding said article therein. After one end of the cylindrical article has been inserted into the head cap portion of the machine, a clamping device is manipulated by the operator to secure the article in the guiding means and in said head portion of the machine.

After the article has been properly inserted and clamped in the head cap portion, the operator manipulates an air valve, which causes said head portion to rock from article-receiving position to operating position and, in so rocking, submerges the cylindrical article in a liquid contained in a tank or reservoir portion of the machine and alines said article with a tail cap or closure portion of the machine. During submerging of the cylindrical article, its open end permits the interior of said article to be filled with said liquid. After the head cap and the cylindrical article have come to rest in a substantially horizontal or operating position, an electrical switch is manipulated by the operator, which causes a solenoid-operated air valve to be actuated, which, through an air cylinder and piston mechanism, shifts the tail cap portion of the machine horizontally to move said cap over the other open end of the cylindrical article to seal the hollow interior of said article against the leakage of liquid.

After the cylindrical article has been sealed against leakage, the operator manipulates a second electric switch to cause a second solenoid-operated air valve to be actuated, said air valve in turn controlling the flow of air to a second cylinder and piston arrangement, causing it to force a plunger through a central bore in the head cap and into the hollow interior of the cylindrical article to apply pressure to the liquid contained therein to create the required pressure to test the strength of the side wall structure of said article.

After the proper degree of pressure has been obtained in the interior of the cylindrical article, a pressure-operated switch mechanism functions to cause the second solenoid valve mechanism to be operated again to reverse the action of the pressure plunger to cause it to be withdrawn from the interior of the cylindrical article and from the central bore in the head cap portion of the machine. After the plunger has been fully withdrawn, the operator again manipulates the first electric switch to cause the first solenoid-actuated air valve to be operated again to cause the tail closure or cap to be withdrawn from the cylindrical article. After the tail cap has been withdrawn from the article, the operator again manipulates the air valve to cause the head cap portion of the machine to be moved from operating position to article-receiving and -removing position, after which the clamp for securing the article in the head cap is released and said article is removed from the head cap portion of the machine.

A pressure-indicating gauge connecting with the hollow interior portion of the cylindrical article being tested is located within convenient observing position of the operator and continuously indicates the pressure of the liquid within said article to instantly reveal any defects in its side wall structure.

The portion of the mechanism described in general above which is pertinent to an understanding of the present invention will now be described in detail with references to the appended drawings, throughout the various views of which like reference numerals refer to like parts.

Directing attention to Figs. 1 to 5 inclusive, the machine of the present invention comprises a main body portion 30 formed of channel-shaped side members 31 and 32 and similarly-shaped end members 33 and 34, which secure said side members in spaced relationship to each other, said body portion being supported by four legs 35, which rest on a suitable support or base.

A reservoir 29, holding a suitable viscous liquid, such as a light grade of machine oil, in which the articles being tested are submerged, is formed by the side members 31 and 32 in cooperation with channel-shaped cross members 36 and 37 secured therebetween and by a sump pan 38, shown best in Figs. 1 and 3 and having a leak-proof connection with the side members 31 and 32 and the cross members 36 and 37. The entrance to the reservoir 29 is formed by a flared flange 39 likewise having a leak-proof connection with the side members 31 and 32 and the cross members 36 and 37.

Secured respectively to the inside surfaces of the cross members 36 and 37 (Fig. 3) are reinforcing plates 40 and 41, said plate 40 having secured thereto a hinge block having a bore which rotatably supports a hinge pin 42 secured in a bore in a head cap 43. The head cap 43 has a large shallow bore 44, arranged to receive one end of a cylindrical article 45, having comparatively thin side walls, the strength of which is to be tested in the present machine. The diameter of the bore 44 is substantially larger than the external diameter of the cylindrical article 45 to provide ample room for a sealing washer 46, formed of any suitable material, such as leather or synthetic rubber, and constructed to yieldingly engage the periphery of said article 45 to form a leak-proof seal for its left-hand end. The right-angled flange of the sealing washer 46 (Fig. 3) fits snugly in a counterbore in the head cap 43 and is secured in said counterbore by a ring 47, in turn secured to said head cap 43 by a plurality of spaced bolts 48. The interior circumference of the ring 47 is large enough to provide ample clearance for the external circumference of the cylindrical article 45.

Secured to a downward surface of the head cap 43 (Figs. 3 and 4) is a plate 49, having secured on its top surface, in spaced relationship to each other, guide segments 51 and 52 having similar arcuate guide surfaces 53, which are in alinement with each other and in alinement with the bore 44 in said head cap 43 for the purpose of guiding the articles 45 into said bore 44. The rigidity of the plate 49 is substantially increased by a tapered reinforcing rib 50 depending from its lower surface (Fig. 3) and extending approximately the full length of said plate 49.

Secured to the upper surface of the plate 49 (Figs. 1 and 3) is a block 54 having a slot arranged to receive the lower end of a hook-shaped clamp member 55 carrying a convenient hand piece 56 for its manipulation, said member 55 being pivoted on a pin carried by said block 54. Secured to the upper end of the clamp member 55 is a clamping block 57, formed of suitable plastic material, which, when the clamp member 55 is moved to effective position, frictionally engages the upper portion of the periphery of the article 45, as shown in Fig. 3, to secure said article against the arcuate surfaces 53. An extending stop surface 58 (Fig. 4), formed on the interior of the clamp member 55, engages the periphery of the article 45 to terminate the clamping movement of said clamp member 55.

The hinge pin 42, which is free in the portion of the hinge secured to the plate 40 and is secured in the head cap 43, has secured on one of its ends a crank 60 (Figs. 1 to 5 inclusive) pivotally connected by a link 61 to a clevis 62 secured to one end of a piston rod 63, the other end of which is connected to a piston (not shown) operating in a cylinder 64 secured to an angle bracket 65 (Fig. 3) in turn secured to the side member 32. Opposite ends of the cylinder 64 are connected by corresponding conduits or pipes 66 and 67 (Figs. 1 and 7) to a control valve 68 secured to the side member 31. A pipe 69 connects the control valve 68 to a supply pipe 70 connected with any convenient and suitable type of compressed air source for supplying the required compressed air to the cylinder 64 to operate the piston contained therein and the rod 63. Likewise, the valve 68 (Figs. 1 and 7) is connected to an exhaust pipe 71 in turn connected by a pipe 72 to an exhaust muffler or silencer 73 secured to the side members 31 and 32 by suitable straps. The valve 68 is provided with a suitable handle 74 for its operation.

When the machine is at rest, the valve 68 is so positioned that the pipe 67 is connected to the air supply pipe 70, which forces the piston of the cylinder 64 to the left, as viewed here, which, through the rod 63, the link 61, and the crank 60, maintains the head cap 43 in its elevated or article-receiving and -removing position, as shown in Figs. 1 and 4, so that the cylindrical articles 45 may be easily and readily removed from and inserted into the bore in said head.

With the head cap 43 in article-receiving position, one end of one of the cylindrical articles 45 may be guided into the bore 44 by the arcuate guide surfaces 53 on the segments 51 and 52 and moved inwardly or to the left, as viewed here, until the left-hand end of said article contacts the bottom of said bore 44. After the article 45 is properly inserted into the bore 44, the clamp 55 is moved to effective position to clamp said article against the arcuate surfaces 53 to retain said article in proper position in said bore 44 while the head cap 43 is moving to and from operating position. Thereafter, the operator manipulates the valve handle 74 and the valve 68 (Figs. 1, 4, and 7) to connect the pipe 67 to the exhaust pipe 71 and to simultaneously connect the pipe 66 to the supply pipe 70, to admit air under pressure into the left-hand end of the cylinder 64 to drive the piston and the rod 63 toward the right. Right-hand movement of the rod 63, through the link 61 and the crank 60, rocks the head cap 43, the plate 40, and the article 45 from their elevated positions, as shown in Figs. 1 and 4, to a substantially horizontal or operating position, as shown in Figs. 3 and 5, which latter position is accurately determined by a raised annular ring 75 (Fig. 3) on the left end of the head cap 43 contacting the right-hand face of the plate 40. Clockwise movement of the head cap 43 and the article 45 submerges said article in the liquid contained in the reservoir 29, and during this submerging the liquid flows into the open right-hand end of said article 45 to completely fill its interior with said liquid.

When the article 45 is in horizontal position, as shown in Figs. 3 and 5, its right-hand end is alined with a large shallow bore 76 in a tail cap or closure 77, said bore 76 being similar in every respect to the bore 44 in the head cap 43. The tail cap 77 is secured to an enlarged end 78 of a piston rod 79, which rod extends through alined borings in the plate 41 and the cross member 37 and through a packing gland 80, which seals the reservoir 29 against leakage. The piston rod 79 is connected to a piston (not shown) which operates in a cylinder 81 (Figs. 1 and 7) secured between the side members 31 and 32. One end of the cylinder 81 is connected by a conduit or pipe 82 (Figs. 1 and 7) to a solenoid-operated control valve 84, and the other end of said cylinder is connected by a pipe 83 to said valve 84. The control valve 84 is connected to the air supply line 70, and it is also connected, by a pipe 85, to the exhaust muffler 73. The control valve 84 (Figs. 1 and 6) is of the type having a solenoid-operated pilot valve which controls a diaphragm or small air-actuated piston which in turn actuates the main three-way valve mechanism for controlling the flow of air through the pipes 82 and 83.

The solenoid coil for the valve 84 (Fig. 6) is connected by a lead wire 86 (Fig. 6) to a main lead line 87, which is in turn connected to one side of an input source of electrical energy. The other side of the solenoid coil is connected by a lead wire 88 to one side of a switch 89, the other side of said switch being connected by a lead 90 to a second main lead 91, which, like the first main lead 87, is connected to the input source of electrical energy. The switch 89 is a relay-actuated switch, and one side of its relay coil 92 is connected by a lead 93 to the leads 86 and 87. The other side of the relay coil 92 is connected by a lead 94 to one side of a switch 95, the other side of which is connected by a lead 96 to one contact of a relay-actuated switch 97, connected with and operating in unison with a similar switch 98, both of which are actuated by a relay coil 99. The other contact of the switch 97 is connected to the main lead 91. One terminal of the relay coil 99 is connected to the main lead 87, and the other terminal of said coil is connected by a lead 100 to one side of a switch 101, the other side of said switch being connected by a lead 102 to a lead 103, in turn connecting with the main lead 91.

The switch 101 (Figs. 1, 3, and 6) has an operating plunger 104, which cooperates with a camming or operating surface 105 on the clevis 62, with the result that, when said clevis 62 nears the end of its movement toward the right, as viewed here, to lower the head cap 43 from its elevated position to its operating position, said camming surface 105, in cooperation with the plunger 104, closes the switch 101 to energize the coil 99 to close the switches 97 and 98 (Fig. 6). The closing of the switch 97 completes the circuit between the main lead 91 and the lead 96, which, as previously explained, connects with one side of the switch 95. The closing of the switch 101 (Figs. 1 and 6), in the manner just explained, also completes a circuit to an electric signal light 117 to notify the operator that the article 45 is properly submerged in the liquid and alined with the bore 76 in the tail cap 77.

The switch 95 (Fig. 2) is secured to a bracket 106, in turn secured to the side member 32. The switch 95 has an operating arm 107 carrying a roller which cooperates with an operating surface on the forward edge of a lever 108 secured to a pin 109 journaled in the bracket 106. The lever 108 has pivotally connected thereto two similar wedge blocks 110 (Figs. 1 and 2) secured in parallel relationship to each other for the purpose of straddling the piston rod 79 (Fig. 3) when the lever 108 is manipulated, as will be described presently, to move said wedge blocks into effective position between the left-hand face of the plate 41 and cooperating wedges 111 secured to the right-hand face of the tail cap 77, as shown here, to prevent retrograde movement of said tail cap 77 when pressure is applied to the liquid in the article 45, as will be explained presently. A rod 112 (Fig. 2), secured to the rearward one of the wedge blocks 110, engages the lever 108 to retain the wedge blocks 110 in the position shown here, so that they will properly straddle the piston rod 79 upon being moved to effective position.

The pin 109 (Fig. 2), which forms a fulcrum between the lever 108 and the bracket 106, has secured thereon a pulley 113 (Figs. 2 and 4) grooved to receive a chain 114 (see also Fig. 1), the extreme upper end of which is secured in said groove and the extreme lower end of which is secured to a suitable weight 115, which yieldingly retains the lever 108 and the wedge blocks 110 in their upward or ineffective positions, as shown here. The lever 108 is provided with a suitable hand-piece 116 (Fig. 1) for the manipulation thereof.

After the article 45 has been submerged in the liquid in the reservoir 29 (Figs. 1, 3, and 5), the operator grasps the handle 116 of the lever 108 and initiates movement of said lever in a counter-clockwise direction, as viewed in Fig. 2, to withdraw the forward surface of said lever from the roller supported by the arm 107, to cause said arm to close the switch 95 to complete the circuit to the relay coil 92 to close the switch 89, which in turn completes the circuit to the solenoid coil for the solenoid-operated valve 84 to energize said coil, to operate said valve 84.

Operation of the valve 84 (Figs. 1 and 7) connects the pipe 83, leading to the right-hand end of the cylinder 81, to the air supply 70 and simultaneously connects the pipe 82, leading to the left-hand end of said cylinder 81, to the exhaust pipe 85, which, through the muffler 73, is in turn connected to atmosphere. The admission of air under pressure to the right-hand end of the cylinder 81 (Figs. 1, 6, and 7) drives the piston, the rod 79, and the tail cap 77 toward the left to move the clearance boring 76 in said tail cap 77 over the right-hand end of the article 45, and this movement continues until the bottom of said boring 76 contacts the right-hand edge of said article 45. As the tail cap 77 moves over the right-hand end of the article 45, a sealing washer 120, similar in every respect to the washer 46 in the head cap 43 and secured in a counterbore in said tail cap 77 by a ring 121 and a plurality of spaced bolts 122, engages the periphery of the right-hand end of said article 45 to seal its interior against the leakage of the liquid contained therein. After the tail cap 77 has moved full distance toward the left, as shown in Fig. 3, the operator completes the movement of the lever 108 to insert the wedge blocks 110 between the plate 41 and between the wedges 111 to secure said cap 77 against movement toward the right when pressure is applied to the liquid sealed within the article 45, as will be explained presently.

Secured on opposite sides of the tail cap 77 (Figs. 3 and 5) are similar shoes 165 and 166 cooperating with corresponding rails 167 and 168 secured, respectively, to the inside surfaces of the side members 31 and 32. The shoes 165 and 166, in cooperation with their respective rails 167 and 168, support the weight of the tail cap 77 as it moves back and forth to maintain the bore 76 in accurate alinement with the right-hand end of the article 45 and to overcome any tendency of said tail cap and the piston rod 79 to revolve.

Figure 7:
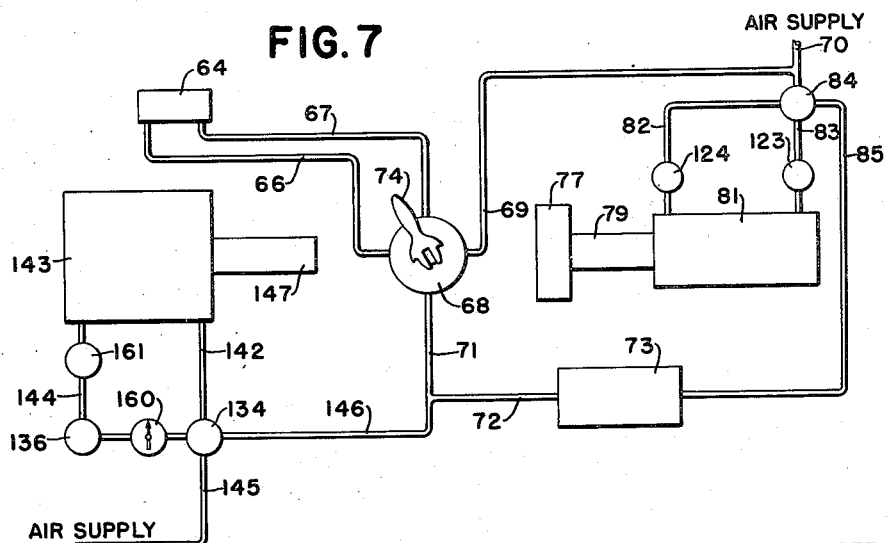
Fig. 7 is a diagram showing the conduits for compressed air and the various manually-operated and electrically-operated valves associated therewith for controlling the flow of the compressed air to the machine-operating mechanisms.

By referring to Fig. 7, it will be noted that the pipe line 83 for the cylinder 81 has therein a control valve 123, and that the pipe line 82 for said cylinder has therein a similar control valve 124, for regulating or metering the flow of air to said cylinder 81, so that the tail cap 77 will move back and forth at the desired speed.

After the wedge blocks 110 (Figs. 1 and 3) have been properly inserted between the tail cap 77 and the plate 41, the operator momentarily depresses a switch button 125 (Figs. 1 and 6), conveniently located on the outside surface of the side member 31, to momentarily complete a circuit between the main lead 87 and a lead 126, connected by the switch 98, which is at this time closed, to a lead 127, connecting with one terminal of a relay coil 128, the other terminal of which is connected by the lead 103 to the main lead 91. This completes a circuit to the relay coil 128, to cause it to simultaneously close switches 129 and 130, connected for unitary operation. Closing of the switch 129 connects a lead 131, extending from the lead 102, with a lead 132, connecting with one terminal of a solenoid coil 133 for a solenoid-operated valve 134 (Figs. 1 and 7) to complete a circuit between said coil and the main input line 91. The other side of the solenoid coil 133 (Fig. 6) is connected by a lead 135 to a pressure-operated switch 136, which is normally closed, said switch in turn being connected by a lead 137 to one side of a manually-operated switch 138, which is normally closed, as shown here, the other side of said switch 138 in turn being connected by a lead 139 to the main input line 87.

The actuation of the switch 125 and the simultaneous functioning of the relay switch 130 form a connection through a lead 140, connecting one terminal of said switch 130 with the lead 135, and a lead 141, connecting the other terminal of said switch 130 with the lead 126, which, through the switch 98 and the lead 127, completes a holding circuit to the relay coil 128 to retain said coil energized and the switches 129 and 130 closed when the manually-operated switch button 125 is released.

The three-way solenoid-operated valve 134 (Figs. 1 and 7) is connected by a pipe 142 to the right-hand end of a cylinder 143, secured to the end plate 33, and said valve 134 is connected by a pipe 144 to the left-hand end of said cylinder. The valve 134 is also connected by a pipe 145 to an air pressure supply source, and said valve is connected by a pipe 146 to the pipe 72 and thence to the exhaust muffler 73, said muffler being open to atmosphere in the usual manner.

The cylinder 143 has operating therein a piston (not shown), to which is connected the left-hand end of a piston rod or plunger 147, the right-hand end of which passes through a packing gland 148 (Figs. 3 and 7) on the cross member 36, thence through a bushing 149 in the member 36 and the plate 40, the central bore of which bushing alines with a central bore 150 in the head cap 43, which latter bore is concentric with the large bore 44.

Depression of the switch 125 (Figs. 1 and 6), as previously explained, energizes the solenoid coil 133 to operate the valve 134 to cause the pipe 144 (Fig. 7) to be connected to the air supply pipe 145 and simultaneously to cause the pipe 142 to be connected to the exhaust pipe 146. Connecting the pipe 144 to the air supply causes the air under pressure to enter the left-hand end of the cylinder 143 to drive the piston and the plunger 147 (Figs. 3 and 7) through the bushing 149 and the bore 150 and through an opening in a sealing washer 151 secured in a counterbore in the head cap 43 by a ring 152 and a plurality of spaced bolts, thence into the interior of the cylindrical object 45, to displace the liquid in said article to generate pressure to test the strength of its side walls.

Shallow borings 153 in the bottom of the boring 44 in the head cap 43, and similar borings 154 in the bottom of the boring 76 in the tail cap 77, connect the hollow interior of the cylindrical article 45 with said borings 44 and 76, whereupon right-hand movement of the plunger 147 into the interior of said article 45 displaces the liquid therein to increase its pressure, said pressure being transmitted through the shallow bores or countersinks 153 and 154 to the liquid in the large bores 44 and 76, to cause said liquid, in cooperation with the extremely tapered edges of the sealing washers 46 and 120, to force said washers into firm contact with the periphery of the cylindrical article 45 to seal its interior against leakage, so that the proper degree of pressure may be generated therein.

As the plunger 147 (Figs. 3 and 7) is gradually forced into the interior of the cylindrical article 45, to the position shown in dot-and-dash lines in Fig. 3, the pressure of the liquid in said article gradually increases, and likewise the pressure in the cylinder 143 gradually builds up or increases, due to the increasing resistance to the right-hand movement or travel of said plunger 147.

When the pressure of the liquid in the interior of the cylindrical article 45 reaches a predetermined amount, the air pressure in the cylinder 143 and the pipe 144 reaches a proportionate amount and opens the normally closed pressure switch 136, which is located in said pipe line 144 (Figs. 6 and 7). This, through the lead 135, the lead 140, the switch 130, the lead 141, the lead 126, the switch 98, and the lead 127, breaks the holding circuit to the relay coil 128 to open the switches 129 and 130. Opening of the switches 129 and 130 (Fig. 6) breaks the circuit to the coil 133 for the valve 134 to again operate said valve, whereupon the pipe 144 is disconnected (Fig. 7) from the supply pipe 145 and simultaneously connected to the exhaust pipe 146, and the pipe 142 is disconnected from the exhaust pipe 146 and is connected to the supply pipe 145. This reverses the action of the piston in the cylinder 143, causing withdrawal of the plunger 147 toward the left from the position shown in dot-and-dash lines in Fig. 3 to its fully returned position, as shown in full lines in Fig. 3.

After the plunger 147 has been fully returned toward the left, the operator grasps the handle 116 (Figs. 1 and 2) and returns the lever 108 upwardly to disengage the wedge blocks 110 from between the plate 41 and the wedges 111, and full restoration of said lever 108 upwardly or clockwise, to the position shown in Fig. 2, restores the switch arm 107 also clockwise to open the switch 95 (Figs. 1, 2, and 6) to break the circuit to the coil 92 of the relay switch 89 to open said switch. Opening of the switch 89 breaks the circuit to the solenoid coil for the valve 84 to again actuate said valve (Fig. 7) to disconnect the pipe 83 from the supply line 70 and simultaneously connect said pipe to the exhaust pipe 85, and to connect the pipe 82 to the supply line 70. This admits the air under pressure to the left-hand end of the cylinder 81, to force the piston in said cylinder, the piston rod 79, and the tail cap 77 toward the right, as viewed in Fig. 3, to withdraw the bore 76 in said tail cap from over the right-hand end of the cylindrical article 45.

After the tail cap 77 has been fully restored toward the right, the operator, through the handle 74 (Figs. 1 and 1) manipulates the valve 68 to reverse the flow of air to the cylinder 64 to cause the piston therein and the piston rod 63 (Figs. 3 and 7) to be returned toward the left. Return movement toward the left of the piston rod 63, through the clevis 62, the link 61, the crank 60, and the pin 42, rocks the head cap 43, the plate 49, and the cylindrical article 45 counter-clockwise, from operating position, as shown in Fig. 3, to the elevated or article-removing and -inserting position, as shown in Fig. 4. Initial return movement toward the left of the piston rod 63 and the clevis 62 causes the camming surface 105 on said clevis (Figs. 3 and 6), in cooperation with the switch pin 104, to open the switch 101, to extinguish the light 117 and simultaneously to break the circuit to the relay switch coil 99, to open the switches 97 and 98. Opening of the switch 97 renders the switch 95 ineffective in case the lever 108 is inadvertently or unintentionally manipulated, and opening of the switch 98 breaks the circuit to the relay coil 128 to prevent operation of the switches 129 and 130 in case the switch button 125 is inadvertently depressed.

After the head cap 43 and the cylindrical article 45 have been fully returned counter-clockwise to elevated position, as shown in Figs. 1 and 4, the operator, through the medium of the handle 56, disengages the clamp 55 from said article 45 and removes it from the bore 44 in the head cap 43 and places said article temporarily in a drain pan 155 (Fig. 1) having suitable supports 156 and 157, which rest on the upper edges of the side members 31 and 32. The left-hand edge of the pan 155 overhangs the flanged upper edge 39 of the reservoir 29, and an opening in said pan permits the liquid from the articles 45 to drain into said reservoir 29.

The bore 44 in the head cap 43 (Figs. 1, 3, 4, and 5) is connected by a pipe 158 to a pressure gauge 159, which indicates the pressure of the liquid within the cylindrical article 45 for the information of the operator, said pressure gauge 159 being suitably located for convenient observation by said operator. Likewise a pressure gauge 160 (Figs. 1 and 7), located in the pipe line 144, indicates to the operator the air pressure in said line and in the cylinder 143, required to move the plunger 147 toward the right to build up the required pressure in the cylindrical article 45. Like the pressure gauge 159, the pressure gauge 160 is suitably located for convenient observation by the operator.

As a safety precaution, a safety valve 161 (Figs. 1 and 7) is connected in the pipe line 144 and is set to open automatically at approximately the same time as the pressure switch 136 (Figs. 1, 6, and 7) opens, to prevent excessive pressure from being built up in the cylinder 143 and the cylindrical article 45 in case said pressure switch 136 fails, for any reason, to open.

The manually operable switch 138 (Figs. 1 and 6), which is normally closed, may be opened by the operator at any time and, when opened, performs the same function as the automatic opening of the pressure switch 136 by breaking the holding circuit to the relay coil 128 to reverse the flow of air to the cylinder 143 to cause the plunger 147 to be withdrawn toward the left, in case it is necessary or desirable. In case the holding circuit is broken by depression of the switch 138 (Fig. 6), said holding circuit may be reestablished by depression of the switch 125, after which the mechanism functions automatically in the manner explained earlier herein.

The compressed air supply pipes 70 and 145 (Figs. 1 and 7) are provided, respectively, with hand valves 162 and 163 for controlling the flow of air from the supply source through said pipes.

A hand-operated valve 164 is provided on the sump pan 38 for the reservoir 29, for draining the liquid out of said reservoir when necessary or desirable.

Summarizing briefly, the foregoing explanation discloses an apparatus novel in design and unique in operation, for testing the strength of the side walls of hollow cylindrical articles which are open at both ends, said apparatus including mechanism for submerging the articles in liquid to fill their interiors with said liquid, mechanism for sealing both ends of the articles against leakage of the liquid contained therein, and mechanism for applying pressure to the liquid within the cylindrical articles to generate a predetermined pressure to test the strength of the side wall structure of said cylindrical articles.

*Mode of operation*

It is believed that a full understanding of the operation of the machine of this invention will have been obtained from a perusal of the preceding specification. However, a brief résumé, giving the various steps of the operating cycle in proper sequence, may be helpful and will now be given.

With the head cap 43 in elevated or article-receiving and -removing position, as shown in Figs. 1 and 4, the operator takes one of the hollow cylindrical articles 45 and inserts one end thereof in the bore 44 in said head cap 43. After the article 45 is properly inserted in the bore 44, the clamp 55 is moved to effective position to clamp said article against the arcuate surfaces 53 on the guide segments 51 and 52. Next, the operator grasps the handle 74 (Figs. 1 and 7) of the air valve 68 and turns said valve to control the flow of compressed air to the cylinder 64, which in turn rocks the head cap 43 and the article 45 clockwise from the positions shown in Figs. 1 and 4 to a substantially horizontal or operating position, as shown in Figs. 3 and 5. This movement of the article 45 submerges it beneath the liquid contained in the reservoir 29, and, inasmuch as the right-hand end of said article is open, its interior is filled with said liquid. Likewise, this movement of the article 45 alines its right-hand end with the bore 76 in the tail cap 77.

Near the end of the clockwise movement of the head cap 43, the switch 101 (Figs. 1, 3, and 6) is closed to light the light 117 and to energize the relay coil 99, causing it to close the control switches 97 and 98, to render the electrically-controlled portion of the machine effective, after the article 45 has been properly submerged in the liquid in the reservoir 29. Next, the operator grasps the handle 116 and rocks the lever 108 counter-clockwise, as observed in Figs. 1 and 2, sufficiently to close the switch 95 (Figs. 1, 2, and 6).

Closing the switch 95 completes a circuit to the relay coil 92 to close the switch 89 to energize the coil of the solenoid-actuated valve 84 to operate said valve. Operation of the valve 84 admits compressed air to the cylinder 81 through the pipe 83, which moves the tail cap 77 toward the left from the position shown in Fig. 4 to the position shown in Fig. 3, to seal the right-hand end of the cylindrical article 45, so that the liquid contained therein will not leak out when pressure is applied thereto. After the tail cap 77 has completed its left-hand movement to close the right-hand end of the article 45, the operator completes counter-clockwise movement of the lever 108 (Figs. 1, 2, and 3) to move the wedge blocks 110 between the plate 41 and the wedges 111 on the cap 77, so that, when the pressure of the liquid within the article 45 is increased, the pressure in the cylinder 81 will not be overcome, and said cap 77 forced away from the right-hand end of said article.

After the wedge blocks 110 are in position, the operator closes the switch 125 (Figs. 1 and 6) to complete a circuit to the coil 128 to close the relay switches 129 and 130 to energize the coil 133 of the solenoid-actuated valve 134 and to complete a holding circuit which retains said solenoid 133 energized when the switch 125 is released. Energization of the coil 133 operates the valve 134 to admit compressed air to the left-hand end of the cylinder 143 to cause the plunger 147 to be moved toward the right (Fig. 3) into the hollow interior of the cylindrical article 45. Movement of the plunger 147 into the interior of the article 45 presses the liquid therein and increases the pressure of said liquid to test the strength of the side wall structure of said article 45.

As soon as a predetermined pressure is obtained within the cylindrical article 45, the pressure switch 136 (Figs. 1 and 6) operates, in the manner explained earlier herein, to break the holding circuit to the coil 128 to open the switches 129 and 130, which immediately de-energizes the solenoid coil 133 to again actuate the valve 134, which in turn causes the plunger 147 to be withdrawn toward the left out of the interior of said article 45 to the position shown in Fig. 3, to release the pressure on the liquid in the interior of said article 45.

After the plunger 147 has been fully restored toward the left, the operator returns the lever 108 (Figs. 1 and 2) clockwise to remove the wedge blocks 110 from between the tail cap 77 and the plate 41, and to open the switch 95 (Fig. 6) to de-energize the coil 92 to open the switch 89. Opening of the switch 89 de-energizes the solenoid coil for the valve 84 to operate said valve again. Operation of the valve 84 reverses the flow of compressed air to the cylinder 81 to cause the tail cap 77 to be returned toward the right, from the position shown in Fig. 3 to the position shown in Fig. 5, to free the right-hand end of the cylindrical article 45.

After the tail cap 77 has been fully restored to the right, the operator again manipulates the valve 68 to reverse the flow of compressed air to the cylinder 64 to cause the head cap 43 and the article 45 to be rocked counter-clockwise from operating position, as shown in Figs. 3 and 5, to elevated or article-inserting and -removing position, as shown in Figs. 1 and 4, so that said article 45 may be readily removed from the bore 44 in said head cap 43.

During the initial part of the return movement counter-clockwise of the head cap 43, the switch 101 (Figs. 3 and 6) is opened to break the circuit to the coil 99 to open the relay switches 97 and 98 to render the electrical portion of the machine inoperative when said head cap 43 and the article 45 are in their elevated positions. After the cylindrical article 45 and the head cap 43 have been returned to article-receiving and -removing positions, the clamp 55 is disengaged from said article 45, and said article is removed from the bore 44 in the head cap 43 and placed in the drain pan 155 (Fig. 1) to drain the excess liquid therefrom. This leaves the machine in readiness for a repetition of the testing or operating cycle.

While the form of mechanism herein shown and described is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a device of the character described for testing the strength of the side wall structure of hollow cylindrical articles, open at both ends, said device including a reservoir filled with liquid in which the articles are to be submerged, the combination of a supporting framework; a closure movably mounted on said framework and normally in an article-receiving position outside the liquid, said closure being constructed to seal one end of an article against leakage and said closure movable from an article-receiving position outside the liquid into an operating position inside the liquid, to submerge said article in the liquid; a second closure movably mounted on said support in a position in alinement with the other end of said article after the article is submerged by movement of the first closure; operating means to move the second closure into engagement with the said other end of the article, after the article has been submerged, and to thereby seal said other end of said article against leakage; a plunger movable through one closure and into the submerged article to bear against the liquid sealed in the hollow interior of the cylindrical article to create pressure against a side wall structure thereof, to test the strength of said side wall structure; and operating means to move the plunger.

2. In a device of the character described for testing the strength of the side wall structure of hollow cylindrical articles, open at both ends, said device including a reservoir filled with liquid in which said articles are to be submerged, the combination of a supporting framework; a closure movably mounted on said framework and normally in an article-receiving position outside the liquid, said closure being constructed to seal one end of an article against leakage; means to move the closure from the article-receiving position outside of the liquid into an operating position inside the liquid, to submerge said article in the liquid to fill the article with liquid; a second closure movably mounted on said framework in a position in alinement with the other end of said article after the article is submerged by movement of the first closure, said second closure being normally disengaged from said other end of the article; a sealing device on said second closure; operating means to move the second closure into engagement with the said other end after the article has been submerged to thereby seal the said other end thereof against leakage of said liquid; means including a plunger movable through one closure and projecting into and movable within the hollow interior of the article, to bear against the liquid confined therein to create equal pressure to test the strength of the side wall structure of said article; and means supported on the framework to move the plunger.

3. In an apparatus of the class described for testing the strength of the side wall structure of a cylindrical or tubular article having a hollow interior, open at both ends, said apparatus including a reservoir filled with liquid, in which said article is to be submerged, the combination of means pivotally mounted on one end of the reservoir and movable into a position out of the liquid to receive one end of the article; sealing means on said means to seal the article thereon; means operatively connected to the first-named means and operable to submerge the said first-named means and the article in the liquid to fill the interior of the article with liquid; means reciprocably mounted in the reservoir and adapted to engage the opposite end of the article when the article is submerged, to seal the said opposite end thereof; means connected to the second-named sealing means whereby the second-named sealing means is actuated; means reciprocably movable through the first-named means and into the interior of said article to bear on the liquid sealed therein to subject the said wall structure thereof to a predetermined pressure to test the strength of said side wall structure; and means to reciprocate the last-named means.

4. In an apparatus of the class described for testing the strength of the wall structure of an article having a hollow interior open at both ends, said apparatus including a reservoir filled with liquid in which the article is to be submerged, the combination of movable means pivotally mounted on one end of the reservoir and movable into a position outside the liquid to receive one end of the article; sealing means on said movable means to seal the article thereon; means operatively connected to the movable means and operable to submerge the movable means and the article in the liquid to fill the interior with said liquid; movable means reciprocably mounted in said apparatus and movable into engagement with the other end of the article, after the article has been submerged, to seal the other end thereof; means reciprocably movable through the movable means and into the interior of the article to bear on the liquid sealed therein to subject the side wall structure to a predetermined pressure to test the side wall structure thereof; and means effective to exert a predetermined pressure on the last-named means to move the last-named means an extent sufficient to raise the pressure in the interior of the article to a predetermined amount.

5. In an apparatus of the class described for testing the strength of the side wall structure of an article having a hollow interior open at both ends, said apparatus including a reservoir filled with liquid in which said article is to be submerged, the combination of a movable means pivotally mounted on one end of the reservoir and movable into a position outside the liquid to receive one end of the article; sealing means on said movable means to seal the end of the article thereon; operating means connected to the movable means and operable to submerge the sealing means and the article in the liquid to fill the interior thereof with said liquid; movable means mounted within the reservoir and movable into engagement with the other end of the article after the article has been submerged, to seal said other end thereof; means reciprocably mounted in the reservoir and operated by air pressure, and movable into the interior of the article to bear on the liquid sealed therein to subject the side wall structure of the article to a predetermined pressure to test the strength thereof; and means to control the degree of air pressure required to move the last-named means into the hollow interior of the article to obtain the said predetermined pressure.

6. In an apparatus of the class described for testing the strength of the side wall structure of a cylindrical article having a hollow interior open at both ends, said apparatus including a reservoir filled with liquid in which said article is to be submerged, the combination of means pivotally mounted on one end of the reservoir and movable into a position to receive one end of the article; sealing means on said means to seal the article thereon; operating means to move the first-named means from an article-receiving position outside the liquid into an operating position inside the liquid, and vice versa, to move the sealing means and the article to submerge the article in the liquid to fill the hollow interior thereof with said liquid; a second sealing means reciprocably mounted in the reservoir and movable into engagement with the other end of said article to seal said other end of the article while it is submerged in the liquid; an aperture in said first sealing means; means movable through said aperture and into the interior of the article, to bear on the liquid sealed therein to apply pressure to the side wall structure of said article to test the strength thereof; and means to control the movement of the last-named means so that the desired pressure is obtained within the interior of the article.

7. In an apparatus of the class described for testing the strength of the side wall structure of a cylindrical article having a hollow interior open at both ends, said apparatus including a reservoir filled with liquid in which said article is to be submerged, the combination of an article-supporting means pivotally mounted on said reservoir and having a means for sealing the article placed thereon; means to move said article-supporting means after the article has been sealed thereon from an article-receiving position outside the liquid into an operating position inside the liquid to submerge said article in the liquid to fill the hollow interior thereof with said liquid; a reciprocating means mounted in the reservoir; a second sealing means carried by the reciprocating means and movable thereby into engagement with the other end of the article to seal said other end of the article while the article is submerged in the liquid; an aperture in the first-named sealing means; means in alinement with the aperture and movable through and sealing said aperture, and movable into the interior of the article to bear on the liquid sealed therein to apply pressure to the side wall structure of said article to test the strength thereof; and means to control the movement of the last-named means.

8. In an apparatus of the character described for testing the strength of the side wall structure of a cylindrical article having a hollow interior open at both ends, said apparatus including a reservoir filled with liquid in which said article is to be submerged, the combination of a means, movably supported on said apparatus, normally in an article-receiving position to receive one end of the article while the article is outside the liquid; means on said movable means to seal the article against leakage of liquid, said sealing means having a central opening; means to move the movably supported means from the article-receiving position to an operating position after the article has been sealed thereon to submerge the article in the liquid to fill the interior thereof with said liquid; means reciprocably mounted on said apparatus and located in alinement with the article after the article has been submerged in the liquid to seal the other end thereof against the leakage of liquid; means movable through said central opening in the first sealing means when it is in operating position, and into the interior of the article, to bear on the liquid sealed therein to create a pressure to test the strength of the side wall structure of said article; and means to control the movement of the last-named means.

9. In an apparatus of the character described for testing the strength of the side wall structure of a cylindrical article having a hollow interior open at both ends, said apparatus including a reservoir filled with liquid in which said article is to be submerged, the combination of means movably mounted on the apparatus to receive and seal one end of the article, said sealing means normally in an article-receiving position outside the liquid, but movable into an operating position inside the liquid, said sealing means having a central opening therein; means to guide the article onto the sealing means; means to secure the article on the guiding means; means to move the sealing means from the article-receiving position outside the liquid into the operating position inside the liquid to submerge the article in the liquid to fill the hollow interior thereof after said one end has been sealed thereon; means movable in said apparatus and alined with the other end of said article when the article is submerged; operating means to move said last-named means into engagement with the other end of the article to seal the interior thereof against leakage of liquid; means reciprocably mounted on said apparatus and movable through the said central opening in the first sealing means into the interior of the article to bear on the liquid sealed therein to apply pressure to the side wall structure of said article to test the strength thereof; and means effective when a predetermined pressure is obtained in the hollow interior of said article to reverse the movement of the bearing means.

10. In a device of the character described for testing the strength of hollow articles, said device including a reservoir filled with liquid in which said articles are to be submerged, the combination of means movably mounted in said reservoir, said means having a sealing means to receive and close one end of an article; means to move the closing means from an article-receiving position outside the liquid to an operating position inside the liquid after the article has been sealed on the closing means to submerge said article in the liquid to fill the hollow interior thereof with said liquid; means reciprocably mounted in the device to be engaged with the other end of the article, after the article has been submerged, to close said other end to seal the liquid in the hollow interior of the article; means to move the second closing means to and from closing position; means to secure the second closing means in closed position; means rendered effective jointly by the first closing means when moved to operating position, and by movement of the securing means to render the second closing means effective; a manually controlled means; means, reciprocably mounted on said apparatus and movable through said first closing means, rendered effective jointly by the first closing means when moved to operating position, and by said manually controllable means to bear on the liquid in the interior of the article to create pressure therein to test the strength of said article; and means effective when the pressure within the hollow article reaches a predetermined amount, to reverse the action of the bearing means to release said pressure.

11. In an apparatus of the character described for testing the strength of the side wall structure of a hollow cylindrical article open at both ends, said apparatus including a reservoir filled with liquid in which the article is to be submerged, the combination of means pivotally mounted on said apparatus and out of the reservoir to receive one end of the article; sealing means on said pivotally mounted means and being normally in article-receiving position; means on the sealing means to guide the article into sealing position on said sealing means; means to clamp the article on the sealing and guiding means; air-actuated means to move the pivotally mounted means from the article-receiving position to an operating position to submerge the said article in the liquid to fill the hollow interior thereof; air-actuated means reciprocably mounted on said apparatus and movable to engage and seal the other end of the article while the article is submerged; electrically operated means to control the air-actuated means; manually operated means to secure the air-actuated means in sealing position; two normally open switches to connect the electrically operated means to a source of electrical energy, the first of said switches arranged to be closed by movement of the first sealing means to operating position, and the second of said switches arranged to be closed by initial operation of the securing means, to move the air-actuated sealing means to engage and seal the other end of the article to confine the liquid in the hollow interior thereof; an aperture in the first-named sealing means; an aperture in the wall of the reservoir in alinement with the aperture in the first-named sealing means; air-actuated means sealing the apertures and movable therethrough to bear on the liquid in the hollow interior of the article to create pressure to test the side wall structure thereof; electrically operated means to control the air-actuated bearing means; means comprising a manually operable switch to initially actuate the second electrically operated means to cause the air-actuated bearing means to bear on the liquid on the hollow interior of the article; and a pressure switch operated automatically by the air for operating the bearing means when the air meets a certain resistance after the pressure in the hollow interior of the article reaches a predetermined amount, to again actuate the second electrically operated means to cause the action of the air-actuated bearing means to be reversed to thereby withdraw the air-actuated bearing means from within the interior of the article.

12. In an apparatus of the character described for testing the strength of the side wall structure of a cylindrical article having a hollow interior open at both ends, said apparatus including a reservoir filled with liquid in which said article is to be submerged, the combination of movable means, pivotally mounted in the reservoir and normally in an article-receiving position, to receive and seal one end of the article, said sealing means having a bore therein; means to move the sealing means from the article-receiving position to an operating position to submerge the article in the liquid to fill the hollow interior thereof with said liquid; means reciprocably mounted in the reservoir and movable into engagement with the other end of the article after the article is submerged to seal the other end thereof; a bore in said reservoir in alinement with said first-named bore; and means movable through the alined bores into the hollow interior of the article to seal said bores and to bear on the liquid sealed in said interior to create pressure to test the strength of the side wall structure of said article.

13. In an apparatus of the character described for testing the strength of the side wall structure of a cylindrical article having a hollow interior open at both ends, said apparatus including a reservoir filled with liquid in which said article is to be submerged, the combination of movable means, pivotally mounted in the reservoir and normally in an article-receiving position to receive and seal one end of the article, said sealing means having a bore therein; means to move the movable means from article-receiving position to an operating position to submerge the article in the liquid to fill the hollow interior thereof with said liquid; a reciprocably movable means mounted in said reservoir and movable into engagement with the other end of the article after the article is submerged to seal the other end thereof; a bore in said reservoir in alinement with the first-named bore; means including an air-actuated plunger movable through the bores and into the hollow interior of the article to seal said bores and to bear on the liquid in said interior to subject the side wall structure of said article to a predetermined pressure to test the strength thereof; and means controlled by the degree of air pressure required to move the plunger into the hollow interior of the article a sufficient distance to produce the predetermined pressure to terminate the movement of said plunger.

CHESTER C. SHERER.
JAMES M. KOONTZ.
RAYMOND H. HOEFLER.

REFERENCES CITED

The following references are of record in the file of this patent:

UNITED STATES PATENTS

| Number | Name | Date |
|---|---|---|
| 324,495 | Stone et al. | Aug. 18, 1885 |
| 334,524 | Giles | Jan. 19, 1886 |
| 1,334,785 | Olsen | Mar. 23, 1920 |
| 1,909,703 | Moore et al. | May 16, 1933 |
| 2,197,585 | Lundquist et al. | Apr. 16, 1940 |
| 2,329,035 | Cross | Sept. 7, 1943 |